United States Patent Office 2,958,795
Patented Nov. 1, 1960

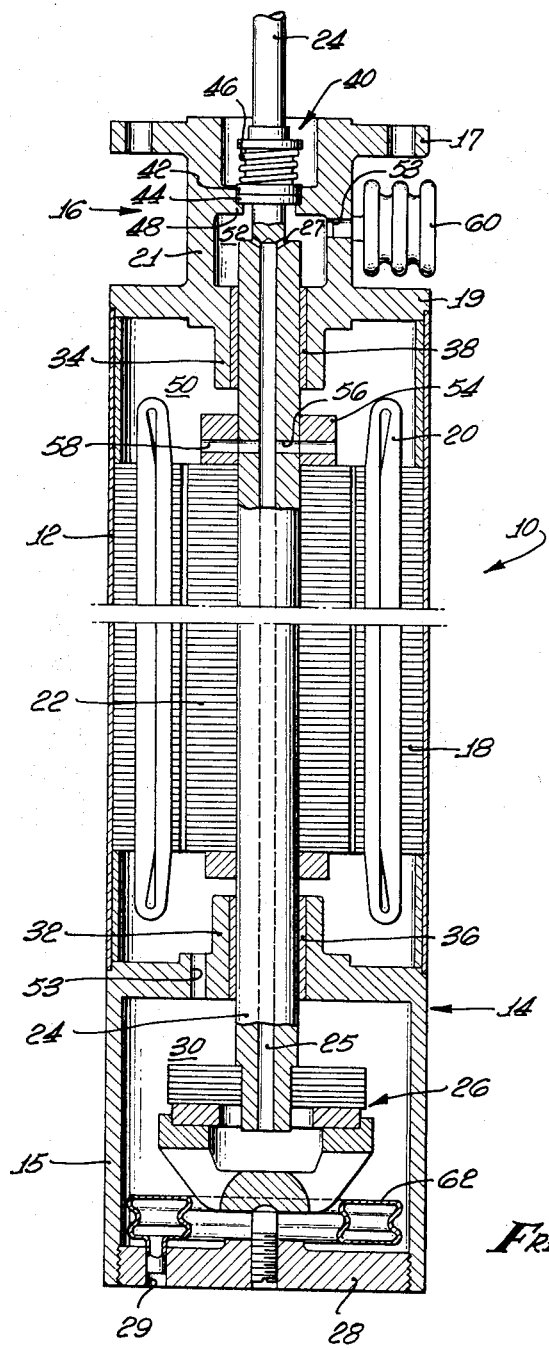

2,958,795

INTERNAL FLUID CIRCULATING SYSTEM FOR SUBMERSIBLE MOTORS OR THE LIKE

Frederick O. Luenberger, Los Angeles, Calif., assignor to U.S. Electrical Motors, Inc., Los Angeles, Calif., a corporation of California Filed July 7, 1958, Ser. No. 746,703

6 Claims. (Cl. 310—87)

This invention relates to submersible motors or the like, and particularly to apparatus for cooling the motor.

In the past, cooling of submersible motors has sometimes been accomplished by circulation of the internal fluid, such as oil, which fills the motor casing. In this manner, the heat is more efficiently dissipated. For example, a pump operated by the rotor shaft creates a pressure differential between opposite ends of the casing, causing flow through the clearance space between the rotor and the stator. A compact internal arrangement is achieved by the aid of a centrifugal pump ring attached to the rotor shaft at one end of the casing and a bore in the rotor shaft charging the pump from the other end of the casing.

It is, of course, necessary to seal the enclosed motor structure so as to exclude exterior liquid. A rotary type seal must be provided between the casing and the rotor shaft, which usually projects upwardly beyond the casing. The seal may have annularly engaging or cooperating parts. To prevent undue leakage past the seal, and especially to prevent entrance of ambient fluid into the motor casing, the pressure at the inner area of the seal, that is, within the casing, should be substantially equal to the pressure at the outside of the seal. In the past, compensating bellows or diaphragms have been utilized to cause equalization of pressure. Bearing in mind that a pump can create either a low pressure or a high pressure, depending upon whether the inlet or the outlet is connected to the area of normal or ambient pressure, the pump ring or other device used for circulation of internal fluid creates certain problems. The position of the compensating bellows or diaphragm relative to the inlet and outlet of the pump determines whether the pump creates low pressure or high pressure. Thus, if the compensating bellows or diaphragm is placed at the end of the motor which supplies the pump inlet, the seal being located at the other end at which the pump discharges, there will be a net increase in pressure at the seal end as compared with ambient pressure, and the seal tends to leak. If, on the other hand, the bellows is relocated so that it is at the end of the motor at which the pump discharges, there will be a net decrease in pressure at the other end. At the very least, a vaporizing problem is created; seepage across the seal may also result.

The primary object of this invention is to overcome these disadvantages. For this purpose, use is made of a novel relative arrangement of the seal, diaphragm or bellows and the circulating pump. In the illustrated embodiment of the invention, novel means provide a separate chamber at the region of the rotary seal. This chamber, so far as pressure is concerned, is isolated from the high pressure region or pump ring discharge by virtue of the small clearance in a sleeve bearing for the rotor shaft. The pump ring inlet connects with the chamber and also to the space at which an equalizing diaphragm or bellows operates. By virtue of this organization, the high pressure area is isolated from the rotary seal, and there are no areas of pressure lower than the ambient pressure, and the vaporizing problem is avoided.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings, the single figure is a diagrammatic longitudinal section view of a submersible motor structure incorporating the invention.

The motor structure 10 comprises a shell 12, a lower end bracket 14 and an upper end bracket 16. Stator laminations 18 are supported centrally of the shell 12. Stator windings 20 connect with an external circuit to an appropriately sealed opening (not shown) in the upper end bracket 16.

The lower end bracket 14 in this instance has a tubular flange 15 extending away from the shell 12. The upper end bracket 16 in this instance comprises two radial flanges 17 and 19 formed on a hollow cylindrical part 21. One of the flanges 19 fits the upper end of the shell 12, and the other flange 17 serves as a means for attachment relative to a pump (not shown) or other load operated by the motor.

The rotor 22 is mounted upon a shaft 24 that projects upwardly through the cylindrical part 21 of the upper end bracket 16 for driving the pump or other device. The lower end of the shaft is supported by the aid of a thrust bearing, generally indicated by the reference character 26, which is accommodated within the cup flange 15 of the lower end bracket 14. The bearing 26 is supported by an end cap 28 closing the space or chamber 30 formed by the lower bracket 14.

The brackets 14 and 16 have upwardly and downwardly facing bosses 32 and 34 in which sleeve bearings 36 and 38 are accommodated for laterally supporting the shaft 24.

A rotary seal structure 40 is provided between the upper bracket 16 and the shaft 24. The seal incorporates annularly engaging parts 42 and 44 respectively carried by the shaft 24 and the bracket 16. In the present instance, the rotary seal part 42 is yieldingly mounted by the aid of a bellows 46. The relatively non-rotary seal part 44 is accommodated in a seat defined by a flange 48 which projects inwardly of the cylindrical bracket part 21.

In order to circulate the oil or other inert fluid filling the motor casing, a pump ring 54 is provided, having radial outlet ports 58. Through these ports liquid is forced outwardly by centrifugal force, whereby a pumping action is attained. The pump ring 54 is mounted above the rotor 22 on the shaft 24 at the upper end of the shell 12. The pump ring 54 acts centrifugally to create a relatively high pressure region 50 at the upper end of the shell 12. A relatively low pressure region at chamber 30 is formed at the lower bracket 14 and at the lower end of the shell 12. This is achieved by supplying the pump ring 54 with fluid from these regions. A bore 25 in the shaft 24 opens within the space 30, and transverse ports 56 in the shaft intersecting the bore 25 provide an inlet for the pump ring 54. Fluid tends to flow downwardly, due to this pumping action, through the clearance space between the rotor 22 and the stator laminations 18 to the space at the lower end of the shell 12.

The space or chamber 30 within the cup flange 15 of the lower bracket 14 opens to the lower end of the shell 12 by way of one or more apertures 53 in the base of the bracket 14.

The high pressure region 50 is isolated from the seal 40 because the sleeve bearing 38 is interposed therebetween. The space or chamber 52 within the cylindrical part 21 of the upper bracket thus forms an isolated chamber.

Fluid from the high pressure area 50 flows only slightly past the sleeve bearing 38 and into the space 52. The aperture 25 in the shaft 24 also communicates with the space 52 to ensure that the pressure does not build up in that space. Accordingly, fluid forced into this space is permitted to return via the aperture 25 to the inlet of the pump ring 54. Transverse ports 27 open into the space 52 from the shaft bore 25 for this purpose.

A bellows 60 substantially equalizes the pressure within the space 52 to that of the ambient fluid, and a generally annular bellows 62, carried by the closure ring 28 at the bottom of the lower end bracket 14, likewise equalizes the pressure. The annular bellows 62 is shown as having its interior portion communicating with the ambient fluid via a port 29 in the ring 28, and the exterior of the bellows 62 is exposed within the space or chamber 30. The bellows 60, on the other hand, has its interior space communicating with the space 52 via a transverse aperture 53 in the upper end bracket 16, and the outer area of the bellows 60 is subjected to the ambient fluid.

By properly controlling clearances, as at the sleeve 38, and the sizes of ports, such as at 27, the pressure in the spaces 52 and 30 can be more or less equalized. One of the bellows 60 and 62 can be deleted.

No substantial net pressure is created across the seal 40 since both the inside and the outside areas of the seal are at substantially equal pressures. At the same time, no extremely low pressure is created relative to the ambient fluid, and the problem of vaporizing is avoided.

It is thus possible to provide circulation of internal fluid in a submersible motor without running the danger of causing leakage past the seal and without running the danger of vaporizing the internal fluid at low temperatures.

The inventor claims:

1. In a submersible motor or the like: a casing; a stator supported in the casing; a shaft projecting through one end of the casing; relatively rotatable sealing members carried by the shaft and the casing respectively; a rotor in the casing and mounted on the shaft; fluid substantially filling the casing; means between the shaft and the casing adjacent said one end of said casing, defining on one side thereof a space in which the internal boundaries of the sealing members are exposed, and permitting only restricted flow along the shaft on opposite sides of said means; the other side of said means being located adjacent one end of the rotor; pump means operated by the shaft and having an inlet opening at the other end of the rotor and an outlet opening at said one end of said rotor; means establishing communication between said space and said other end of said rotor; and means causing the pressure at said other end of said rotor and at said space to be substantially equal to the pressure exterior of the casing at said other end.

2. In a submersible motor or the like: a casing; a stator supported in the casing; a shaft projecting through one end of the casing; relatively rotatable sealing members carried by the shaft and the casing respectively; a rotor mounted on the shaft; fluid substantially filling the casing; means between the shaft and the casing adjacent said one end of said casing, defining on one side thereof a space in which the internal boundaries of the sealing members are exposed, and permitting only restricted flow along the shaft on opposite sides of said means; the other side of said means being located adjacent one end of the rotor; a pump ring mounted on said shaft and discharging at said one end of said rotor; said shaft having passage means establishing communication between said space and the other end of said rotor and charging said pump ring; and means causing the pressure at the shaft passage means to be substantially equal to the pressure exterior of the casing at said one end.

3. In a submersible motor or the like: a casing; a stator supported in the casing; a shaft projecting through one end of the casing; relatively rotatable sealing members carried by the shaft and the casing respectively; a rotor mounted on the shaft; fluid substantially filling the casing; means between the shaft and the casing adjacent said one end of said casing, defining on one side thereof a space in which the internal boundaries of the sealing members are exposed, and permitting only restricted flow along the shaft on opposite sides of said means; the other side of said means being located adjacent one end of the rotor; a pump ring carried by the shaft at said one end of said rotor and discharging thereat; said shaft having a passage opening at the other end of said rotor and charging said pump ring; a pressure equalizing device at said other end of said rotor; and passage forming means establishing communication between said space and said shaft passage for controlling the pressure of fluid in said space.

4. In a submersible motor having a liquid filled casing, a stator and a rotor in the casing, a shaft on which the rotor is mounted, and a seal structure between the shaft and the casing and including a pair of relatively rotatable contacting members carried respectively by the shaft and the casing, the combination therewith of: pump means within the casing for causing a circulation of liquid between the stator and rotor, and operated by the shaft; means forming an isolated chamber in the casing adjacent the seal structure; and means for substantially equalizing the fluid pressure in the chamber with that existing exteriorly of the casing; said pump means having an inlet that opens into said chamber.

5. In a submersible motor having a liquid filled casing, a stator and a rotor in the casing, and a shaft on which the rotor is mounted: means forming a journal bearing structure for the shaft at one end of the casing; said shaft extending through said bearing structure; means forming a chamber around said shaft and external of the casing; a seal structure having relatively moving parts respectively carried by said shaft and said chamber forming means, said seal structure also serving to define said chamber, said chamber being thus substantially isolated from the casing; the shaft extending outwardly beyond the seal structure; means for substantially equalizing the fluid pressure in the chamber and the fluid pressure externally of the chamber; and pump means within the casing and adjacent the journal bearing structure, for causing circulation of the liquid filling past the stator and rotor; said pump means having a pair of inlets, one near the other end of the casing, and the other leading from said chamber.

6. The combination as set forth in claim 8, with additional means at the other end of the casing for substantially equalizing the fluid pressure within and externally of the casing adjacent said other end.

References Cited in the file of this patent

UNITED STATES PATENTS

| | | |
|---|---|---|
| 2,423,436 | Blom | July 8, 1947 |
| 2,736,825 | Hill | Feb. 28, 1956 |
| 2,854,595 | Arutunoff | Sept. 30, 1958 |